US010309486B2

(12) United States Patent
Rentfrow

(10) Patent No.: US 10,309,486 B2
(45) Date of Patent: Jun. 4, 2019

(54) CENTRIFUGAL PENDULUM ABSORBER INCLUDING A GEARED ROLLER

(71) Applicants: Schaeffler Technologies AG & Co. KG, Herzogenaurach (DE); Peter Rentfrow, Smithville, OH (US)

(72) Inventor: Peter Rentfrow, Smithville, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/765,064

(22) PCT Filed: Oct. 7, 2015

(86) PCT No.: PCT/US2015/054458
§ 371 (c)(1),
(2) Date: Mar. 30, 2018

(87) PCT Pub. No.: WO2017/062000
PCT Pub. Date: Apr. 13, 2017

(65) Prior Publication Data
US 2018/0283491 A1    Oct. 4, 2018

(51) Int. Cl.
*F16F 15/14* (2006.01)
*F16H 45/02* (2006.01)

(52) U.S. Cl.
CPC ......... *F16F 15/1471* (2013.01); *F16H 45/02* (2013.01); *F16H 2045/0263* (2013.01)

(58) Field of Classification Search
CPC .. F16F 15/1407; F16F 15/1471; F16F 15/145; F16F 15/1457; F16F 15/1464; F16F 15/1478; F16H 45/02; F16H 2045/0263
See application file for complete search history.

(56) References Cited

U.S. PATENT DOCUMENTS

| 4,291,790 | A | * | 9/1981 | Staub, Jr. | F16H 45/02 192/209 |
| 4,889,012 | A | * | 12/1989 | Dull | F16H 45/02 475/53 |
| 5,551,928 | A | | 9/1996 | Sudau | |

(Continued)

FOREIGN PATENT DOCUMENTS

| DE | 19954278 A1 * | 5/2001 | ......... F16F 15/1464 |
| DE | 102014206296 A1 * | 10/2015 | .............. F16D 3/12 |
| WO | WO2014-123753 A1 | 8/2014 | |

OTHER PUBLICATIONS

Corresponding International Application for PCT/US2015/054458.

*Primary Examiner* — Adam D Rogers
(74) *Attorney, Agent, or Firm* — Davidson, Davidson & Kappel, LLC

(57) ABSTRACT

A centrifugal pendulum absorber is provided. The centrifugal pendulum absorber includes a flange; a first mass slidably attached on a first axial side of the flange; a second mass slidably attached on a second axial side of the flange; and a roller received in slots formed in the flange, the first mass and the second mass. The roller is geared to the flange and at least one of the first and second masses. A method of forming a centrifugal pendulum absorber is also provided. The method includes gearing a roller to a flange of the centrifugal pendulum and to a mass slidably attached to an axial side of the flange. The roller is received in slots formed in the flange and the mass.

13 Claims, 4 Drawing Sheets

(56) References Cited

U.S. PATENT DOCUMENTS

| | | | | |
|---|---|---|---|---|
| 6,374,698 | B1* | 4/2002 | Carlson | F16F 15/145 |
| | | | | 192/207 |
| 6,398,655 | B1* | 6/2002 | Orlamunder | F16F 15/1206 |
| | | | | 464/68.1 |
| 6,408,717 | B1 | 6/2002 | Young et al. | |
| 8,881,622 | B2* | 11/2014 | Maienschein | F16F 15/145 |
| | | | | 74/570.2 |
| 9,765,839 | B2* | 9/2017 | Lorenz | F16F 15/1206 |
| 2012/0168270 | A1 | 7/2012 | Takikawa et al. | |
| 2013/0239745 | A1 | 9/2013 | Maienschein et al. | |
| 2018/0149232 | A1* | 5/2018 | Yoshikawa | F16F 15/31 |

* cited by examiner

CENTRIFUGAL PENDULUM ABSORBER INCLUDING A GEARED ROLLER

The present disclosure relates generally to torque converters and more specifically to centrifugal pendulum absorbers of torque converters.

BACKGROUND

U.S. Pat. No. 8,881,622 discloses a centrifugal pendulum absorber centrifugal pendulum absorber ("CPA") including conventional rollers.

FIG. 1a shows a portion of a side view of a conventional CPA 200 and FIG. 1b shows an enlarged view of one set of slots 202, 208 of CPA 200. In CPA 200, as is conventional, slots 202, 208 have a positive curvature, which means slots 202 receiving rollers 204 in masses 206 have a convex shape with respect to a center axis of CPA 200 and slots 208 receiving rollers 204 in flange 210 have a concave shape with respect to the center axis of CPA 200. In other words, circumferential edges 212 of slot 202 are further away from the center axis than an interior middle peak edge 214 of slot 202 halfway between circumferential edges 212 and circumferential edges 216 of slot 208 are closer to the center axis than an interior middle peak edge 218 of slot 208 halfway between circumferential edges 216.

SUMMARY OF THE INVENTION

A centrifugal pendulum absorber is provided. The centrifugal pendulum absorber includes a flange; a first mass slidably attached on a first axial side of the flange; a second mass slidably attached on a second axial side of the flange; and a roller received in slots formed in the flange, the first mass and the second mass. The roller is geared to the flange and at least one of the first and second masses.

A torque converter including the centrifugal pendulum absorber is also provided. The torque converter includes a damper assembly including the centrifugal pendulum absorber.

A method of forming a centrifugal pendulum absorber is also provided. The method includes gearing a roller to a flange of the centrifugal pendulum and to a mass slidably attached to an axial side of the flange. The roller is received in slots formed in the flange and the mass.

BRIEF DESCRIPTION OF THE DRAWINGS

The present invention is described below by reference to the following drawings, in which.

DETAILED DESCRIPTION

The disclosure provides a CPA including track slots having following a straight path or having negative curvature, in contrast to conventional CPA track slots having a positive curvature. The straight or negative tracks can cause rollers to move out of alignment and wedge, resulting in stuck pendulum masses. Providing a set of gear racks with complementary teeth on a roller may assure the roller stays aligned in the track slots.

Figure 1A:
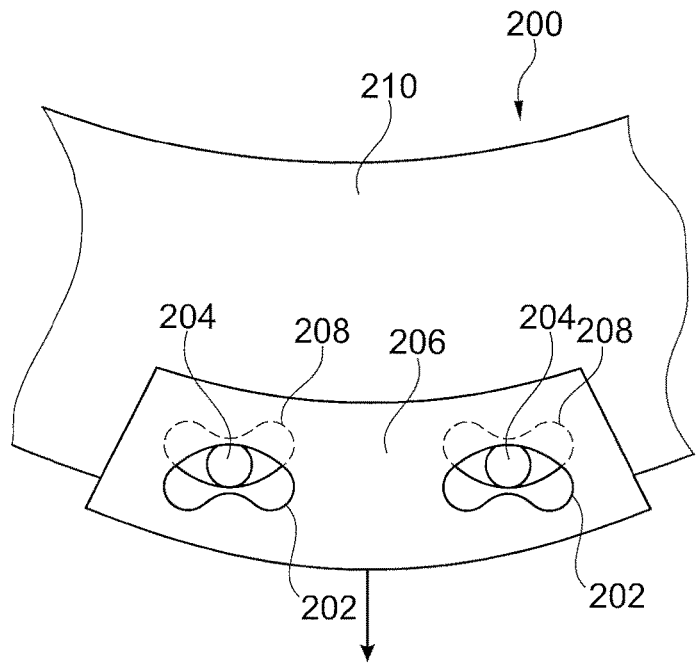
FIG. 1a shows a portion of a side view of a conventional CPA and FIG. 1b shows an enlarged view of one set of slots of the conventional CPA.
Figure 1B:
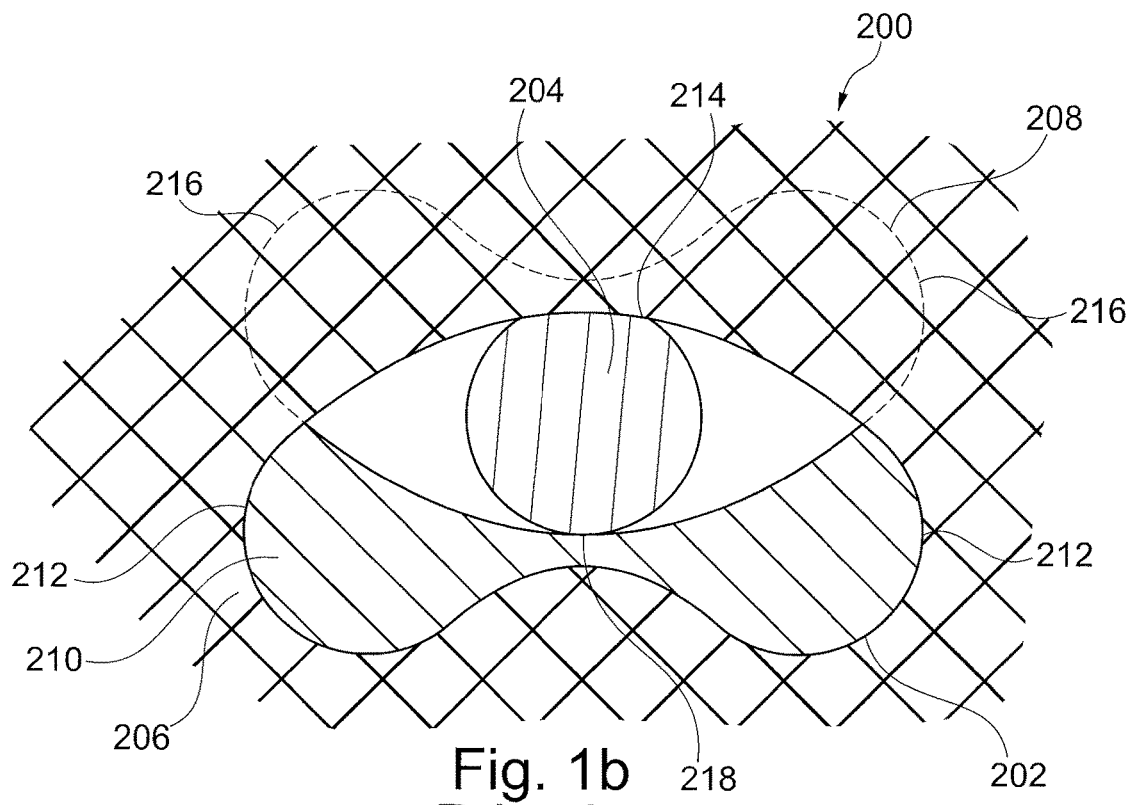
Figure 2:
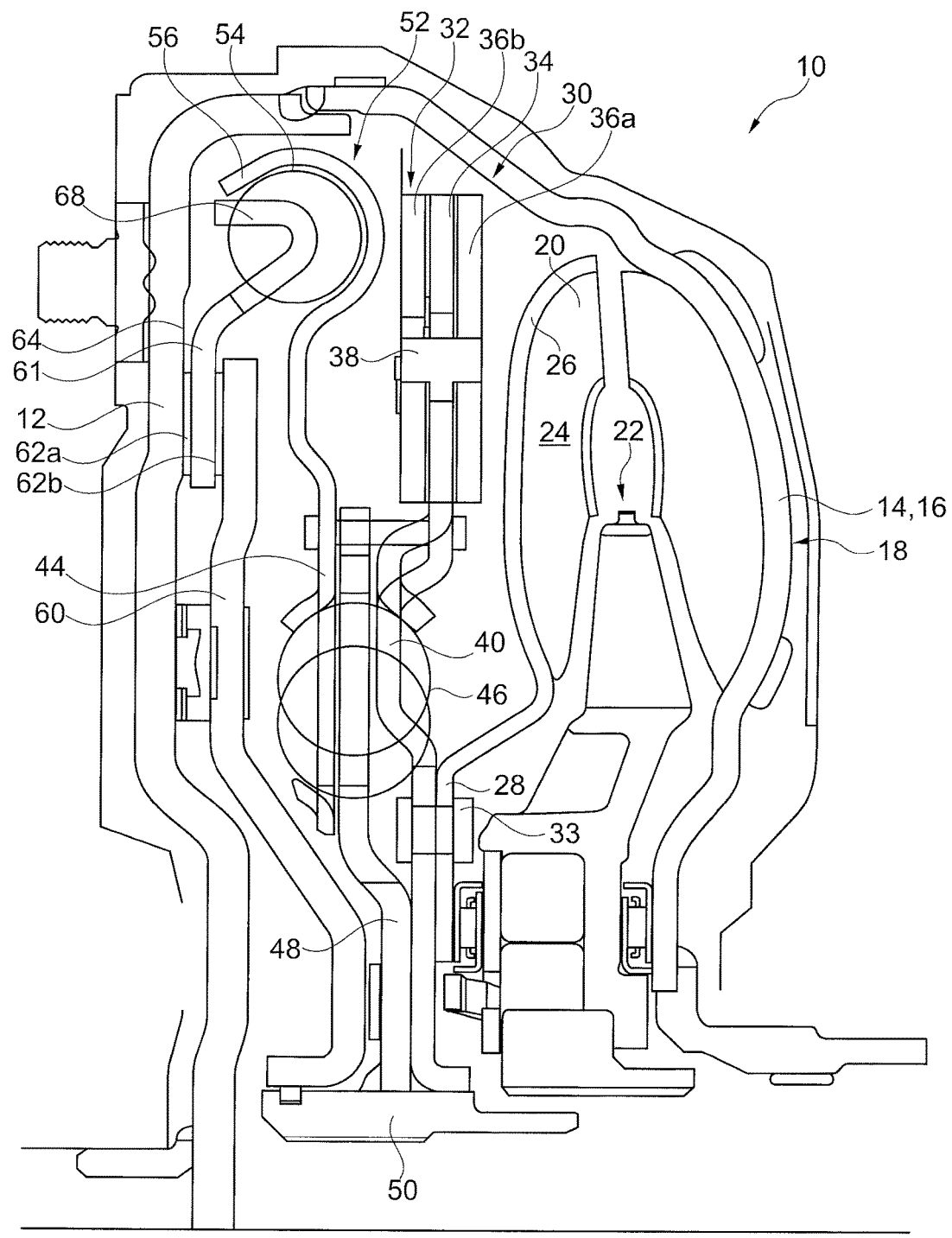
FIG. 2 schematically shows a cross-sectional side view of a torque converter in accordance with an embodiment of the present invention.

FIG. 2 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 opposite impeller 18 and a stator 22 axially between impeller 18 and turbine 20. Turbine 20 includes a plurality of blades 24 supported on a rounded portion 26 of turbine 20 at a rear-cover side of turbine 20. Turbine 20 further includes an inner radial extension 28 protruding radially inward from rounded portion 26. On a front-cover side of turbine 20, turbine 20 is connected to a damper assembly 30.

Damper assembly 30 includes a CPA 32 in accordance with an embodiment of the present invention. CPA 32 includes a flange 34, which is riveted at an inner radial end thereof to inner radial extension 28 of turbine 20 by a plurality of circumferentially spaced rivets 33 and two sets of masses—a set of masses 36a facing a rear cover side of torque converter 10 and a set of masses 36b facing a front cover side of torque converter 10—on opposite axial sides of flange 34. Each set of masses 36a, 36b includes a plurality of masses circumferentially offset from each other. In one preferred embodiment, CPA 32 includes four masses 36a and four masses 36b. As discussed in further detail below with respect to FIGS. 3a and 3b, masses 36a, 36b are circumferentially movable with respect to flange 34 by rollers 38 that are geared to flange 34 and one or both of masses 36a, 36b of each set.

A radially inner section of flange 34 forms a first cover plate 40 of damper assembly 30. Damper assembly 30 further includes a second cover plate 44 axially between first cover plate 40 and front cover 12, with cover plates 40, 44 supporting a plurality of circumferentially spaced radially inner set of springs 46 axially therebetween. Sandwiched axially between cover plates 40, 44, damper assembly 30 includes a drive flange 48 whose inner radial end 50 is configured for connecting to a transmission input shaft. Drive flange 48 includes a plurality of circumferentially extending slots formed therein for receiving springs 46. Radially outside of springs 46, damper assembly 30 further includes a plurality of circumferentially spaced radially outer set of springs 54. A radially outer end 52 of second cover plate 44 forms a spring retainer 56 for receiving springs 54.

A piston 60 is provided between front cover 12 and damper assembly 30 and a clutch plate 61 is provided axially between piston 60 and front cover 12. Clutch plate 61, at a radially outer end thereof, includes a plurality of circumferentially spaced projections 68 for extending into the circumferential spaces formed between springs 52. Clutch plate 61, at a radially inner end thereof, is provided with a friction material 62a on a front cover side thereof for engaging an inner axial surface 64 of front cover 12 and a friction material 62b on a rear cover side thereof for engaging piston 60. Piston 60, clutch plate 61 and inner axial surface 64 form a lockup clutch for drivingly coupling turbine 20 to front cover 12 via damper assembly 30. Fluid pressure differences between a front cover side of piston 60 and a rear cover side of piston 60 control whether piston 60 engages or is disengaged from front cover 12. Cover plates 40, 44 transfer torque from turbine 20 to drive flange 48, which in turn drives the transmission input shaft. Cover plates 40, 44 together transfer torque to springs 52, which transfer torque to clutch plate 61.

Figure 3A:
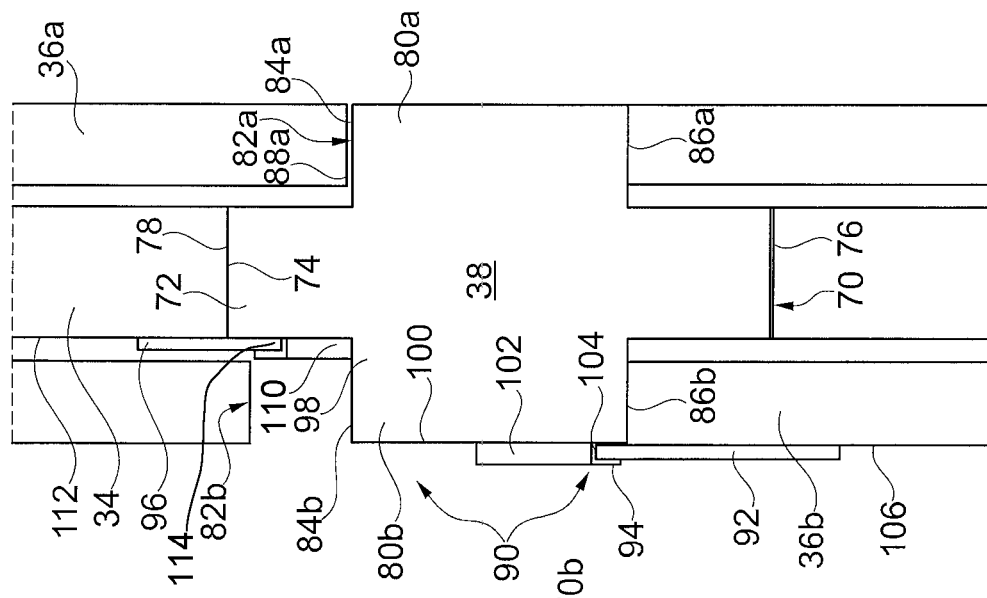
FIG. 3a shows and enlarged schematic cross-sectional side view of a section of a centrifugal pendulum absorber of the torque converter shown in FIG. 2.
Figure 3B:
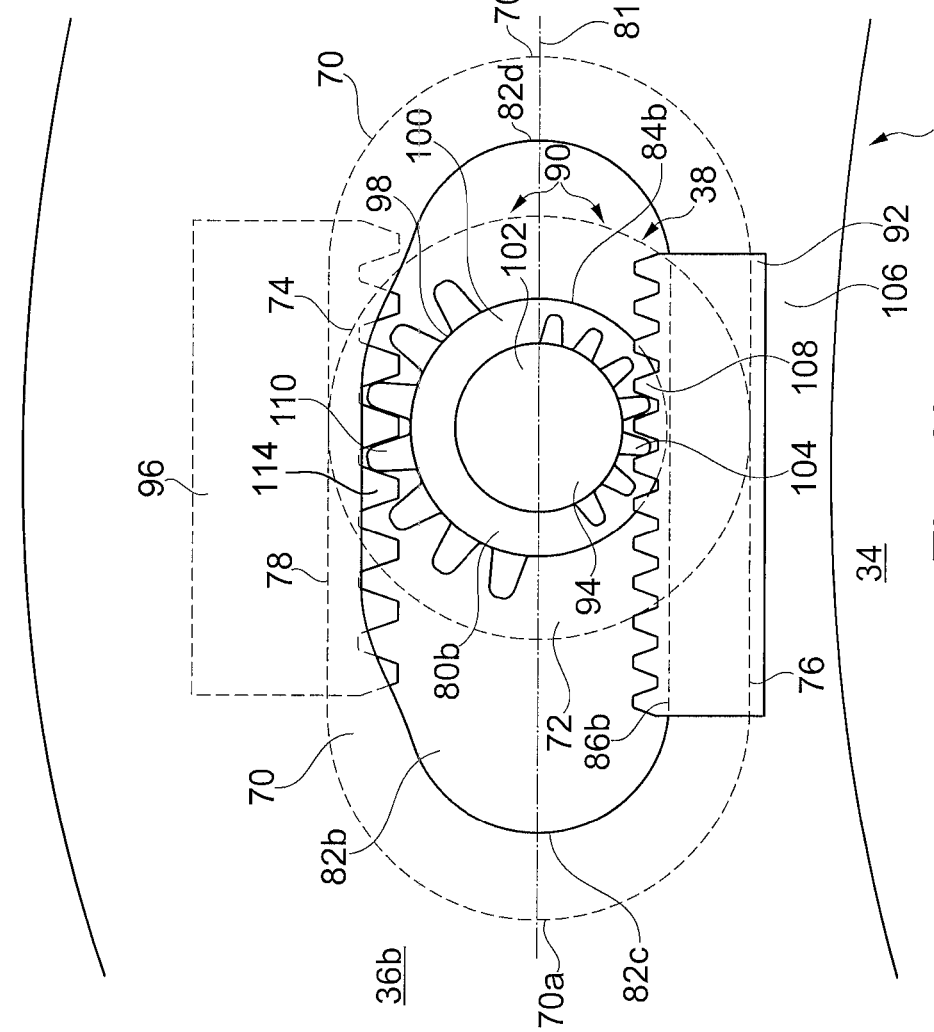
FIG. 3b shows an enlarged plan view of a section of the centrifugal pendulum absorber of the torque converter shown in FIG. 2.

FIG. 3a shows and enlarged schematic cross-sectional side view of a section of CPA 32 and FIG. 3b shows an enlarged plan view of a section of CPA 32. FIG. 3a shows one roller 38 within one mass 36a, one mass 36b and flange 34, while FIG. 3b shows flange 34 and one mass 36b. As noted above, masses 36a, 36b are circumferentially slidable with respect to flange 34 by rollers 38 that are geared to flange 34 and, in the embodiment shown in FIGS. 3a, 3b, mass 36b. In other embodiments, rollers 38 may be geared to mass 36a, or both of masses 36a, 36b. Flange 34 includes a plurality of circumferentially spaced and radially aligned elongated track slots 70 extending circumferentially therein, one of which is shown in FIGS. 3a, 3b. Masses 36a, 36b are fixed together by bolts extending axially through circumferentially extending slots, which are circumferentially offset from slots 70, formed in flange 34.

One roller 38 is received in each slot 70, with a base section 72 of each roller 38 including an outer circumferential surface 74 arranged for rolling along a radially inner circumferential surface 76 and a radially outer circumferential surface 78 of the respective slot 70. Roller 38 also includes two protrusions 80a, 80b extending axially from opposite axial sides of base section 72. Protrusions 80a, 80b are cylindrical in shape and each extend into a slot 82a, 82b formed in the respective mass 36a, 36b. As shown in FIG. 3b, mass 36b includes an inner circumference 83 and an outer circumference 85, with slots 82b extending longitudinally between circumferences 83, 85. Mass 36a is similarly formed with slots 82a. Slots 70, 82a, 82b, and roller 38 sliding therein, all follow a straight path 81, with slot 70 being longer and wider than each of slots 82a, 82b. More specifically, as shown by slots 70 and 82b in FIG. 3b, slot 70 follows straight path 81 between longitudinal ends 70a, 70b and slot 82b follows straight path 81 between longitudinal ends 82c, 82d. Slot 82a is the same length as slot 82b. During movement of CPA 32, each roller 38 may move in the respective slots 70, 82a, 82b. In particular, masses 36a, 36b are guided over respective protrusions 80a, 80b of roller 38 on flange 34, and rollers 38 can roll in slots 82a, 82b and in slots 70. Protrusion 80a includes an outer circumferential surface 84a arranged for rolling along a radially inner circumferential surface 86a and a radially outer circumferential surface 88a of the respective slot 82a. Protrusion 80b includes an outer circumferential surface 84b arranged for rolling along a radially inner circumferential surface 86b of the respective slot 82b.

Roller 38 is geared to mass 36b and flange 34 by a rack and pinion connection 90. More specifically, roller 38 is geared to a first rack 92 provided on mass 36b by a first roller gear 94 and is geared to a second rack 96 provided on flange 34 by a second roller gear 98. First roller gear 94 is formed as a pinion fixed to protrusion 80b at an outwardly (i.e., away from flange 34) facing axial side 100 of protrusion 80b. Gear 94 includes a disc shaped base 102 and a plurality of teeth 104 projecting radially outward from base 102. In the embodiment shown in FIGS. 3a, 3b, teeth 104 protrude from only a portion—approximately half—of the outer circumference of base 102. First rack 92 is fixed to an outwardly facing axial surface 106 of mass 36b and includes mass teeth 108 aligned in a straight line along radially inner circumferential surface 86b of slot 82b. Teeth 108 extend radially outward from rack 92 past radially inner circumferential surface 86b. Teeth 104 of roller gear 94 intermesh with teeth 108 of rack 92 during the rolling of roller 38 with respect to slot 82b.

Second roller gear 98 is formed as a pinion integral with protrusion 80b. Second roller gear 98 is aligned in a space axially between flange 34 and mass 36b. Gear 98 includes a plurality of teeth 110, which are axially offset from teeth 104, projecting radially outward from outer circumferential surface 84b of protrusion 80b. In the embodiment shown in FIGS. 3a, 3b, teeth 104 protrude from only a portion—approximately half—of the outer circumferential surface 84b. Second rack 96 is fixed to an axial surface 112 of flange 34 facing mass 36b and includes flange teeth 114 aligned in a straight line parallel to the line of teeth 108 along radially outer circumferential surface 88b of slot 82b. Teeth 114 extend radially inward from rack 96 past radially inner circumferential surface 86b. The free ends of teeth 114 extend toward and in an opposite direction as the free ends of teeth 108. Teeth 110 of roller gear 98 intermesh with teeth 114 of rack 96 during the rolling of roller 38 with respect to slot 82b. The intermeshing of teeth 104 of roller gear 94 with teeth 108 of rack 92 and the intermeshing of teeth 110 of roller gear 98 with teeth 114 of rack 96 may assure roller 36 stays aligned in slots 70, 82a, 82b and does not move out of alignment and wedge during the operation of CPA 32 and the sliding of masses 36a, 36b with respect to flange 34, preventing stuck pendulum masses 36a, 36b.

Figure 4:
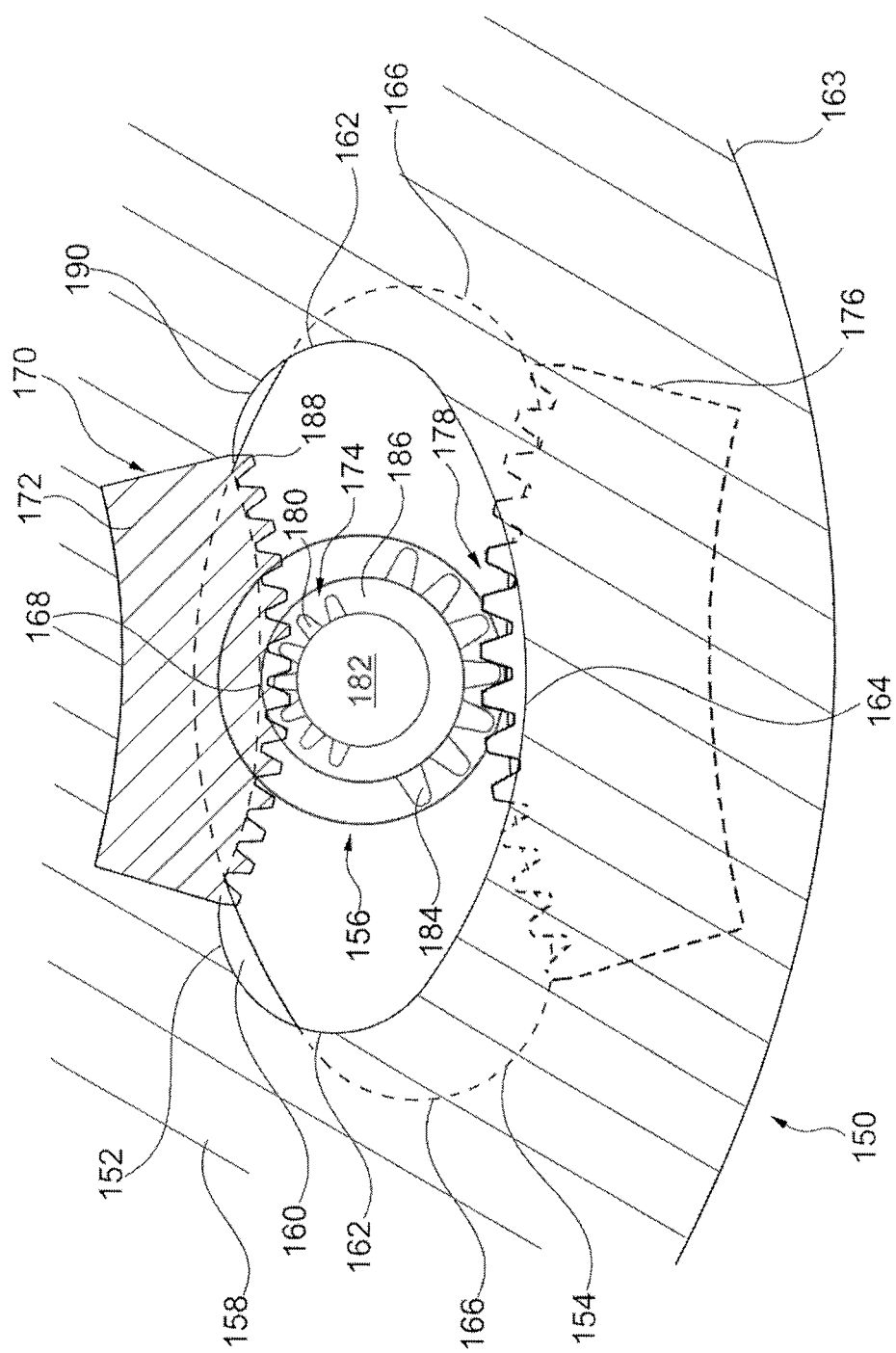
FIG. 4 shows a partial cross-sectional side view of a CPA in accordance with an alternative embodiment of the present invention.

In alternative embodiments, instead of the slots following a straight path, slots of the CPA may have a negative curvature. FIG. 4 shows a portion of a CPA 150 according to an alternative embodiment of the present invention including slots 152, 154 having a negative curvature, which means slots 152 receiving rollers 156 in masses 158 have a concave shape with respect to a center axis of CPA 150 and slots 154 receiving rollers 156 in flange 160 have a convex shape with respect to the center axis of CPA 150. In other words, circumferential edges 162 of slot 152 are closer to the center axis of CPA 150 and further from outer circumference 163 of mass 158 than an interior peak middle edge 164 of slot 152 halfway between circumferential edges 162 and circumferential edges 166 of slot 154 are further from the center axis of CAP 150 and closer to outer circumference 163 of mass 158 than an interior middle peak edge 168 of slot 154 halfway between circumferential edges 166.

Similar with CPA 32 described above, roller 156 is geared to mass 158 and flange 160 by a rack and pinion connection 170. More specifically, roller 156 is geared to a first rack 172 provided on mass 158 by a first roller gear 174 and is geared to a second rack 176 provided on flange 160 by a second roller gear 178. First roller gear 174 includes radially outwardly projecting teeth 180 projecting radially outward from a base 182 and second roller gear 178 includes radially outwardly projecting teeth 184 projecting radially outward from a base 186. First rack 172 is fixed to an outwardly facing axial surface of mass 158 and includes mass teeth 188 aligned in a curved line along radially inner circumferential surface 190 of slot 152. Teeth 180 of roller gear 174 intermesh with teeth 188 of rack 172 during the rolling of roller 156 with respect to slot 152. Second rack 176 is fixed to an outwardly facing axial surface of flange 160 and includes flange teeth 192 aligned in a curved line along radially outer circumferential surface 194 of slot 154. Teeth 184 of roller gear 174 intermesh with teeth 192 of rack 176 during the rolling of roller 156 with respect to slot 154.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A centrifugal pendulum absorber comprising:
a flange;
a first mass slidably attached on a first axial side of the flange;
a second mass slidably attached on a second axial side of the flange; and
a roller received in a slot formed in the flange, a slot formed in the first mass and a slot formed in the second mass, the roller being geared to the flange and at least one of the first and second masses,
wherein the roller is geared to the flange outside of the slot formed in the flange.

2. A centrifugal pendulum absorber comprising:
a flange;
a first mass slidably attached on a first axial side of the flange;
a second mass slidably attached on a second axial side of the flange; and
a roller received in a slot formed in the flange, a slot formed in the first mass and a slot formed in the second mass, the roller being geared to the flange and at least one of the first and second masses,
wherein the first mass includes mass teeth provided thereon and the roller includes first roller teeth intermeshed within the mass teeth;
wherein the flange includes flange teeth provided thereon and the roller includes second roller teeth intermeshed with the flange teeth,
wherein the first mass includes a mass rack including the mass teeth.

3. The centrifugal pendulum absorber as recited in claim 2 wherein the flange includes a flange rack including the flange teeth, the mass rack, the flange rack, the first roller teeth and the second roller teeth forming a rack and pinion connection.

4. The centrifugal pendulum absorber as recited in claim 3 wherein the mass rack is axially offset from the flange rack.

5. The centrifugal pendulum absorber as recited in claim 2 wherein the roller includes a base portion received in the slot formed in the flange, a first protrusion extending axially from the base portion and being received in the slot formed in the first mass and a second protrusion extending axially from the base portion and being received in the slot formed in the second mass, the first protrusion being provided with the first roller teeth and the second roller teeth.

6. The centrifugal pendulum absorber as recited in claim 2 wherein the slot formed in the flange, the slot formed in the first mass and the slot formed in the second mass are non-arcuate.

7. The centrifugal pendulum absorber as recited in claim 2 wherein the slots formed in the flange, the first mass and the second mass have a negative curvature with respect to a center axis of the centrifugal pendulum absorber.

8. A torque converter comprising:
a damper assembly including the centrifugal pendulum absorber as recited in claim 2.

9. The torque converter as recited in claim 8 further comprising a lockup clutch and a turbine, the damper assembly connecting the lockup clutch and turbine.

10. A method of forming a centrifugal pendulum absorber comprising:
gearing a roller to a flange of the centrifugal pendulum absorber and to a mass slidably attached to an axial side of the flange, the roller being received in a slot formed in the flange and a slot formed in the mass,
wherein the gearing of the roller to the flange includes intermeshing flange teeth provided on the flange with teeth of the roller,
wherein the flange includes a flange rack including the flange teeth.

11. The method as recited in claim 10 wherein the gearing of the roller to the mass includes intermeshing mass teeth provided on the mass with the teeth of the roller.

12. The method as recited in claim 11 wherein the mass includes a mass rack including the mass teeth.

13. The method as recited in claim 10 wherein the roller is geared to the flange outside of the slot formed in the flange.

* * * * *